United States Patent
Zhou et al.

(10) Patent No.: US 9,447,317 B2
(45) Date of Patent: Sep. 20, 2016

(54) STANNATE FLUORESCENT MATERIAL AND METHOD FOR PREPARING SAME

(75) Inventors: Mingjie Zhou, Shenzhen (CN); Rong Wang, Guangdong (CN); Guitang Chen, Guangdong (CN)

(73) Assignees: OCEAN'S KING LIGHTING SCIENCE & TECHNOLOGY CO., LTD., Shenzhen (CN); SHENZHEN OCEAN'S KING LIGHTING ENGINEERING CO., LTD., Shenzhen (CN)

( * ) Notice: Subject to any disclaimer, the term of this patent is extended or adjusted under 35 U.S.C. 154(b) by 113 days.

(21) Appl. No.: 14/399,005

(22) PCT Filed: Jul. 31, 2012

(86) PCT No.: PCT/CN2012/079461
§ 371 (c)(1),
(2), (4) Date: Nov. 5, 2014

(87) PCT Pub. No.: WO2014/019152
PCT Pub. Date: Feb. 6, 2014

(65) Prior Publication Data
US 2015/0129803 A1    May 14, 2015

(51) Int. Cl.
*C09K 11/78* (2006.01)
*C09K 11/02* (2006.01)
(Continued)

(52) U.S. Cl.
CPC .......... *C09K 11/025* (2013.01); *C09K 11/7731* (2013.01); *H01J 29/20* (2013.01)

(58) Field of Classification Search
CPC .................. C09K 11/025; C09K 11/7751
See application file for complete search history.

(56) References Cited

U.S. PATENT DOCUMENTS

| 9,062,254 B2 | 6/2015 | Zhou et al. |
| 2005/0061732 A1 | 3/2005 | Grangeon et al. |

(Continued)

FOREIGN PATENT DOCUMENTS

| CN | 1015656014 A | 10/2009 |
| CN | 101775279 A | 7/2010 |

(Continued)

OTHER PUBLICATIONS

International Search Report dated May 2, 2013.
(Continued)

*Primary Examiner* — Carol M Koslow
(74) *Attorney, Agent, or Firm* — Polsinelli PC

(57) ABSTRACT

The present invention provides a stannate fluorescent material having a formula: $A_{2-x}SnO_4{:}Eu_x@SnO_2@M_y$; wherein A is selected from the group consisting of Ca, Sr, and Ba; M is at least one metal nanoparticles selected from the group consisting of Ag, Au, Pt, Pd, and Cu; $0<x\le0.05$; y is a mole ratio of M to Sn, and $0<y\le1\times10^{-2}$; @ represents coating, in the stannate fluorescent material, M serves as a core, $SnO_2$ serves as an intermediate layer shell, and $A_{2-x}SnO_4{:}Eu_x$ serves as an outer layer shell. In the stannate fluorescent material, a core-shell structure is formed by coating at least one metal nanoparticles selected from the group consisting of Ag, Au, Pt, Pd, and Cu, since metal nanoparticles can improve the internal quantum efficiency of the fluorescent material, the stannate fluorescent material exhibits a higher luminous intensity.

10 Claims, 2 Drawing Sheets

(51) Int. Cl.
*C09K 11/77* (2006.01)
*H01J 29/20* (2006.01)

(56) References Cited

U.S. PATENT DOCUMENTS

2013/0075661 A1  3/2013  Zhou et al.
2013/0214206 A1  8/2013  Zhou et al.

FOREIGN PATENT DOCUMENTS

| CN | 102051170 A | 5/2011 |
|---|---|---|
| CN | 102191054 A | 9/2011 |
| EP | 2581434 A1 | 4/2013 |
| JP | H0326781 A | 2/1991 |
| JP | 2007146102 A | 6/2007 |
| JP | 2013528683 A | 7/2013 |
| JP | 2014500901 A | 1/2014 |
| WO | WO/03026781 A1 | 4/2003 |

OTHER PUBLICATIONS

Japanese Office Action dated Feb. 15, 2016.
H.M. Yang et al., "A novel red emitting phosphor $Ca_2SnO_4$: $Eu^{3+}$", Journal of Solid State Chemistry 178, pp. 917-920 (2005).
Yu-Chung Chen et al.,"Influence of processing conditions on synthesis and photoluminescence of $Eu^{3+}$-activated strontium stannate phosphors", Journal of Alloys and Compounds 398, pp. 25-260 (2005).

STANNATE FLUORESCENT MATERIAL AND METHOD FOR PREPARING SAME

CROSS-REFERENCE TO RELATED APPLICATIONS

This application is a National Phase filing under 35 U.S.C. §371 of PCT/CN2012/079461 filed on Jul. 31, 2012, the entire contents of which is hereby incorporated by reference.

FIELD OF THE INVENTION

The present disclosure relates to luminescent materials, and more particularly relates to a stannate fluorescent material and a method for preparing the same.

BACKGROUND OF THE INVENTION

Field emission display (FED) is a flat panel display technology having a great development potential. While the operating voltage of field emission display device is lower than that of the cathode ray tube (CRT), the operating current density of FED is relatively larger, e.g., about 10 to 100 $\mu A \cdot cm^{-2}$. Accordingly, the fluorescent material for the field emission display requires a higher demand, such as better chromaticity, higher luminous efficiency at low voltage, and no brightness saturation phenomena at high current densities.

Currently, the study on FED mainly focuses on two aspects: one is to use and modify the existing fluorescent material for CRT; another is to search for new fluorescent material. The commercial available fluorescent material for CRT is usually based on sulfide, however, when it is used for manufacturing FED, sulfur may reacts with trace molybdenum, silicon or germanium contained in the cathode due to the instability of sulfides, which weakens the electron emission, resulting a weak FED luminous intensity.

SUMMARY OF THE INVENTION

Accordingly, in order to address the problem of low emission intensity of existing fluorescent material, it is necessary to provide a stannate fluorescent material having a higher emission intensity and method for preparing the same.

A stannate fluorescent material, having a formula: $A_{2-x}SnO_4:Eu_x@SnO_2@M_y$, wherein A is selected from the group consisting of Ca, Sr, and Ba;

M is at least one metal nanoparticles selected from the group consisting of Ag, Au, Pt, Pd, and Cu;

$0<x\le0.05$;

y is a mole ratio of M to Sn, and $0<y\le1\times10^{-2}$;

@ represents coating, in the stannate fluorescent material, M serves as a core, $SnO_2$ serves as an intermediate layer shell, and $A_{2-x}SnO_4:Eu_x$ serves as an outer layer shell.

A method of preparing a stannate fluorescent material, comprising the following steps:

preparing a sol containing M, wherein M is at least one metal nanoparticles selected from the group consisting of Ag, Au, Pt, Pd, and Cu;

surface-treating the sol containing M, adjusting the pH value of the sol containing M to 10 to 12, heating and stirring the sol containing M at a temperature of 60° C. to 90° C., adding sodium stannate, potassium stannate, or tin tetrachloride according to a mole ratio y of M to Sn of formula $SnO_2@M_y$, stirring and reacting, separating and drying to obtain $SnO_2@M$ powder, wherein $0<y\le1\times10^{-2}$;

mixing an A compound, an Eu compound, and the $SnO_2@M$ powder according to a stoichiometric ratio of formula of $A_{2-x}SnO_4:Eu_x@SnO_2@M_y$ to obtain a mixture;

heating the mixture, cooling and grinding the mixture to obtain the stannate fluorescent material having the formula $A_{2-x}SnO_4:Eu_x@SnO_2@M_y$;

wherein A is selected from the group consisting of Ca, Sr, and Ba; $0<x\le0.05$; in the stannate fluorescent material, M serves as a core, $SnO_2$ serves as an intermediate layer shell, and $A_{2-x}SnO_4:Eu_x$ serves as an outer layer shell.

In one embodiment, the step of preparing the sol containing M includes:

mixing a salt solution of at least one metal selected from the group consisting of Ag, Au, Pt, Pd, and Cu, with an additive and a reductant, and reacting for 10 to 45 minutes to obtain the sol containing M.

In one embodiment, the concentration of the salt solution of at least one metal selected from the group consisting of Ag, Au, Pt, Pd, and Cu ranges from $1\times10^{-3}$ mol/L to $5\times10^{-2}$ mol/L;

the additive is at least one selected from the group consisting of polyvinylpyrrolidone, sodium citrate, cetyl trimethyl ammonium bromide, sodium lauryl sulfate, and sodium dodecyl sulfate;

the concentration of the additive in the sol containing M ranges from $1\times10^{-4}$ g/mL to $5\times10^{-2}$ g/mL;

the reductant is at least one selected from the group consisting of hydrazine hydrate, ascorbic acid, sodium citrate, and sodium borohydride;

a mole ratio between the reductant and metal ion of the salt solution of at least one metal selected from the group consisting of Ag, Au, Pt, Pd, and Cu ranges from 3.6:1 to 18:1.

In one embodiment, the step of surface-treating the sol containing M includes: adding the sol containing M into an aqueous solution of polyvinyl pyrrolidone and stirring for 12 to 24 hours.

In one embodiment, the concentration of the aqueous solution of polyvinyl pyrrolidone ranges from 0.005 g/mL to 0.01 g/mL.

In one embodiment, the step of adjusting the pH value of the sol containing M to 10 to 12 includes adjusting the pH value using sodium hydroxide or ammonia.

In one embodiment, the stirring and reacting time takes 1 to 5 hours.

In one embodiment, the step of heating the mixture includes:

precalcining the mixture at a temperature of 800° C. to 1200° C. for 2 to 12 hours, and then calcining the mixture at 1000° C. to 1400° C. for at 0.5 to 6 hours.

In one embodiment, the A compound is oxides, carbonates, acetates or oxalates corresponding to A; the Eu compound is oxides, carbonates, acetates or oxalates corresponding to Eu.

In the stannate fluorescent material, a core-shell structure is formed by coating at least one metal nanoparticles selected from the group consisting of Ag, Au, Pt, Pd, and Cu, since metal nanoparticles can improve the internal quantum efficiency of the fluorescent material, the stannate fluorescent material exhibits a higher luminous intensity.

DETAILED DESCRIPTION OF THE EMBODIMENTS

Reference will now be made to the drawings to describe, in detail, embodiments of the present stannate fluorescent material and method for preparing the same.

According to one embodiment, a stannate fluorescent material is represented by a formula: $A_{2-x}SnO_4$: $Eu_x@SnO_2@M_y$;

wherein A is selected from the group consisting of Ca, Sr, and Ba;

M is at least one metal nanoparticles selected from the group consisting of Ag, Au, Pt, Pd, and Cu;

$0 < x \leq 0.05$;

y is a mole ratio of M to Sn, and $0 < y \leq 1 \times 10^{-2}$;

@ represents coating, in the stannate fluorescent material, M serves as a core, $SnO_2$ serves as an intermediate layer shell, and $A_{2-x}SnO_4:Eu_x$ serves as an outer layer shell.

The notation ":" in the formula $A_{2-x}SnO_4:Eu_x$ represents doping, i.e., Eu is a dopant, and the divalent Eu ion is the active ion of the fluorescent material. The outer layer shell of $A_{2-x}SnO_4:Eu_x$ is formed by doping europium (Eu) into stannate ($A_{2-x}SnO_4$).

Stannate ($A_{2-x}SnO_4$) exhibits an excellent chemical stability and thermal stability, its internal structural defects is very advantageous for forming high quality of fluorescent materials. Additionally, the stannate of Ca, Sr and Ba is relatively high stability.

As an active ion of the stannate fluorescent material, the europium ion allows the fluorescent material to emit red fluorescence when applying the voltage.

As the core of the stannate fluorescent material, M can produce a surface plasmon resonance effect, which can improve the internal quantum efficiency of the stannate fluorescent material.

In the stannate fluorescent material, a core-shell structure is formed by coating at least one metal nanoparticles selected from the group consisting of Ag, Au, Pt, Pd, and Cu, since metal nanoparticles can improve the internal quantum efficiency of the fluorescent material, the stannate fluorescent material exhibits a higher luminous intensity.

The M, $SnO_2$, and $A_{2-x}SnO_4:Eu_x$ of the stannate fluorescent material are chemical stable substances, such that the fluorescent material with core-shell structure exhibits an excellent stability during use and maintains good emitting performance.

Accordingly, this stannate fluorescent material possesses such advantages as good stability and good luminous performance, which can be widely used in display and lighting fields.

Compared with conventional sulfide fluorescent materials, this stannate fluorescent material does not produce toxic sulfide during use, such that it is environmental non-toxic and safe to use.

Figure 1:
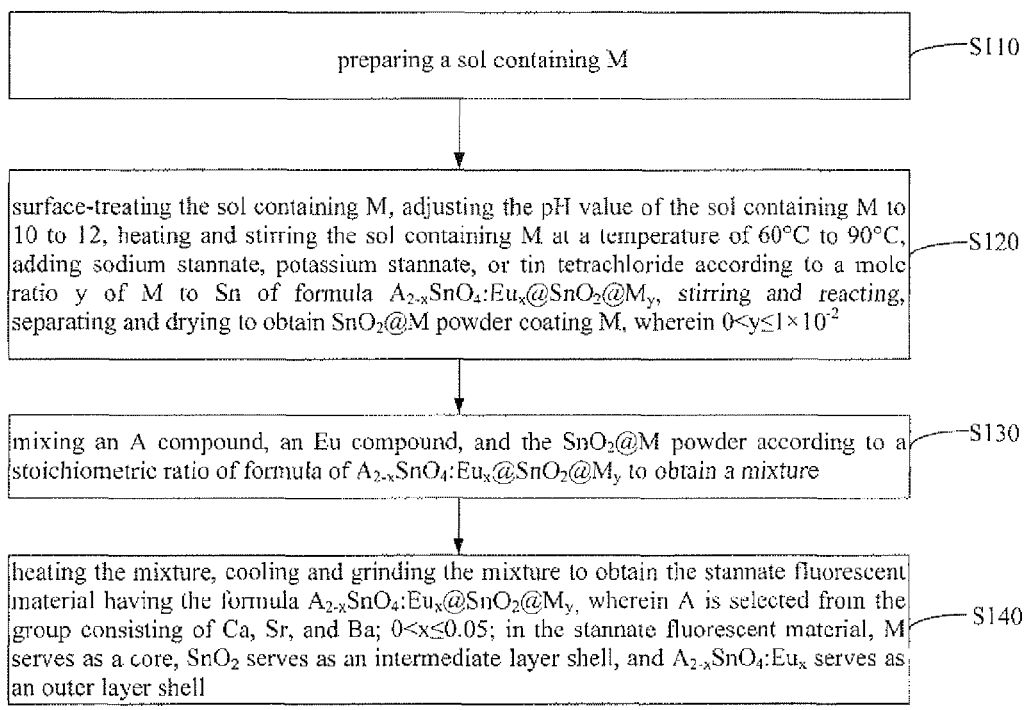
FIG. 1 is a flow chart of a method of preparing a stannate fluorescent material in accordance with one embodiment.

Referring to FIG. 1, a method of preparing a stannate fluorescent material includes the following steps:

Step S110, a sol containing M is prepared.

M is at least one metal nanoparticles selected from the group consisting of Ag, Au, Pt, Pd, and Cu.

The step of preparing the sol containing M includes: mixing a salt solution of at least one metal selected from the group consisting of Ag, Au, Pt, Pd, and Cu, with an additive and a reductant, and reacting to obtain the sol containing M. Under the premise of obtaining the sol containing M, the reacting time is preferred between 10 to 45 minutes for saving energy.

The salt solution of Ag, Au, Pt, Pd, or Cu can be chloride solution, nitrate solution and the like of Ag, Au, Pt, Pd, or Cu. The concentration of the solution of Ag, Au, Pt, Pd, or Cu can be determined as required, which preferably ranges from $1\times10^{-3}$ mol/L to $5\times10^{-2}$ mol/L.

The additive is at least one selected from the group consisting of polyvinylpyrrolidone, sodium citrate, cetyl trimethyl ammonium bromide, sodium lauryl sulfate, and sodium dodecyl sulfate. The concentration of the additive in the sol containing M ranges from $1\times10^{-4}$ g/mL to $5\times10^{-2}$ g/mL.

The reductant is at least one selected from the group consisting of hydrazine hydrate, ascorbic acid, sodium citrate, and sodium borohydride. The reductant is first prepared into an aqueous solution having a concentration of $1\times10^{-4}$ mol/L to 1 mol/L, and the aqueous solution is then mixed with the salt solution of at least one metal selected from the group consisting of Ag, Au, Pt, Pd, and Cu and the additive to perform the reaction.

A mole ratio between the reductant and metal ion of the salt solution of at least one metal selected from the group consisting of Ag, Au, Pt, Pd, and Cu ranges from 3.6:1 to 18:1.

Step S120, the sol containing M is surface-treated, the pH value of the sol containing M is adjusted to 10 to 12, the sol containing M is then heated and stirred at a temperature of 60° C. to 90° C., sodium stannate, potassium stannate, or tin tetrachloride is added according to a mole ratio y of M to Sn of formula $SnO_2@M_y$, after stirring and reacting, separating and drying, $SnO_2@M$ powder is obtained, wherein $0 \leq y \leq 1 \times 10^{-2}$.

To facilitate coating, the sol containing M from step S110 is surface-treated, such that a stable $SnO_2@M$ structure, in which M is coated by $SnO_2$, can be obtained.

The step of surface-treating the sol containing M includes: adding the sol containing M into an aqueous solution of polyvinyl pyrrolidone (PVP) and stirring for 12 to 24 hours. The concentration of polyvinyl pyrrolidone (PVP) preferably ranges from 0.005 g/mL to 0.01 g/mL Specifically, the pH value of the sol containing M is adjusted to 10 to 12 by using sodium hydroxide (NaOH) or ammonia, the sol is then heated and stirred in a water bath at a temperature of 60° C. to 90° C. During stirring, according to the mole ratio y of M to Sn of formula $SnO_2@M_y$, sodium stannate ($Na_2SnO_3$), potassium stannate ($K_2SnO_3$) or tin tetrachloride ($SnCl_4$) is fast added with stirring. The mixture is stirred and reacted, then separated and dried to obtain $SnO_2@M$ powder, wherein $0 \leq y \leq 1 \times 10^{-2}$.

The stirring and reacting time is preferable in a range of from 1 to 5 hours. During the reaction, sodium stannate ($Na_2SnO_3$), potassium stannate ($K_2SnO_3$) or tin tetrachloride ($SnCl_4$) can hydrolyse into $Sn(OH)_4$, which will be calcinated to $SnO_2$. $SnO_2$ can coat the surface of M to form the $SnO_2@M$ powder. The reaction equation involving tin sodium ($Na_2SnO_3$) or tin potassium ($K_2SnO_3$) is as follows:

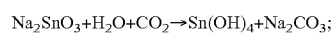

$$Na_2SnO_3 + H_2O + CO_2 \rightarrow Sn(OH)_4 + Na_2CO_3;$$

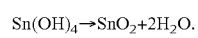

$$Sn(OH)_4 \rightarrow SnO_2 + 2H_2O.$$

The reaction equation involving tin tetrachloride ($SnCl_4$) is as follows:

$$SnCl_4 + 4NH_4OH \rightarrow Sn(OH)_4 + 4NH_4Cl;$$

$$Sn(OH)_4 \rightarrow SnO_2 + 2H_2O.$$

Step S130, an A compound, an Eu compound, and the $SnO_2@M$ powder are mixed according to a stoichiometric ratio of formula of $A_{2-x}SnO_4:Eu_x@SnO_2@M_y$, to obtain a mixture.

The A compound is oxides, carbonates, acetates or oxalates corresponding to Ca, Sr or Ba, such as calcium carbonate ($CaCO_3$), calcium nitrate $Ca(NO_3)_2$, barium oxalate ($BaC_2O_4$) and the like.

The Eu compound is oxides, carbonates, acetates or oxalates corresponding to Eu, such as oxalate europium ($Eu_2(C_2O_4)_3$), europium acetate ($Eu(CH_3COO)_3$), europium carbonate ($Eu_2(CO_3)_3$) and the like.

The A compound, the Eu compound, and the $SnO_2@M$ powder are mixed according to a stoichiometric ratio of formula of $A_{2-x}SnO_4:Eu_x@SnO_2@M_y$, to obtain a mixture, which will be used for subsequent reaction.

Step S140, the mixture is heated, cooled and ground to obtain the stannate fluorescent material having the formula $A_{2-x}SnO_4:Eu_x@SnO_2@M_y$, wherein A is selected from the group consisting of Ca, Sr, and Ba; $0<x\leq0.05$; in the stannate fluorescent material, M serves as a core, $SnO_2$ serves as an intermediate layer shell, and $A_{2-x}SnO_4:Eu_x$ serves as an outer layer shell.

Specifically, the mixture obtained from step S130 is precalcined at a temperature of 800° C. to 1200° C. for 2 to 12 hours, and then calcined the mixture at 1000° C. to 1400° C. for at 0.5 to 6 hours. Next, the mixture is cooled to the room temperature, and then ground to powder, such that the stannate fluorescent material coating metal nanoparticles is obtained, which has the formula $A_{2-x}SnO_4:Eu_x@SnO_2@M_y$;

wherein A is selected from the group consisting of Ca, Sr, and Ba;

M is at least one metal nanoparticles selected from the group consisting of Ag, Au, Pt, Pd, and Cu;

$0<x\leq0.05$;

y is a mole ratio of M to Sn, and $0<y\leq1\times10^{-2}$;

@ represents coating, in the stannate fluorescent material, M serves as a core, $SnO_2$ serves as an intermediate layer shell, and $A_{2-x}SnO_4:Eu_x$ serves as an outer layer shell.

The notation ":" in the formula $A_{2-x}Sn_4:Eu_x$ represents doping, i.e., Eu is a dopant, and the divalent Eu ion is the active ion of the fluorescent material. The outer layer shell of $A_{2-x}SnO_4:Eu_x$ is formed by doping europium (Eu) into stannate ($A_{2-x}SnO_4$).

The forgoing preparing method of the stannate fluorescent material uses high-temperature solid-phase method to prepare the fluorescent material having M served as a core, $SnO_2$ served as an intermediate layer shell, and $A_{2-x}SnO_4:Eu_x$ served as an outer layer shell. The method is simple, low equipment requirement, no pollution, easy to control, and suitable for industrial production.

Detailed examples are described below.

Example 1

This example describes a process of preparation of $Ba_{1.992}SnO_4:Eu_{0.008}@SnO_2@Pd_{1\times10^{-5}}$ by using high-temperature solid-phase method.

Preparation of sol containing Pd nanoparticles was described below. 0.22 mg of palladium chloride ($PdCl_2 \cdot 2H_2O$) was dissolved in 19 mL of deionized water. After the palladium chloride was fully dissolved, 11.0 mg of sodium citrate and 4.0 mg of sodium lauryl sulfate were weighed and dissolved into the palladium chloride aqueous solution under magnetic stirring. 3.8 mg of sodium borohydride was weighed and dissolved into 10 mL of deionized water to obtain a sodium borohydride reducing solution with a concentration of $1\times10^{-2}$ mol/L. Under magnetic stirring, 1 mL of sodium borohydride solution with a concentration of $1\times10^{-2}$ mol/L was fast added to the palladium chloride aqueous solution. After reaction for 20 minutes, 20 mL of sol containing Pd nanoparticles was obtained with a Pd content of $5\times10^{-5}$ mol/L.

Preparation of $SnO_2@Pd$ was described below. 1.5 mL of sol containing Pd nanoparticles ($5\times10^{-5}$ mol/L) was weighed and placed in a beaker, and 8 mL of PVP (0.005 g/mL) was added and stirred for 16 hours, so as to obtain surface-treated sol containing Pd nanoparticles. The pH value of surface-treated sol containing Pd nanoparticles was adjusted to 10 using NaOH. After the sal was stirred for 10 min, it was transferred to a water bath at a constant temperature of 60° C. with stirring. 25 mL of $Na_2SnO_3$ solution (0.3 mol/L) was fast added, stirred and reacted for 2 hours, centrifugally separated and dried to obtain $SnO_2$ powder coating the metal nanoparticles Pd, i.e. $SnO_2@Pd$.

Preparation of $Ba_{1.992}SnO_4:Eu_{0.008}@SnO_2@Pd_{1\times10^{-5}}$ was described below. 1.7955 g of $BaC_2O_4$, 0.0181 g of $Eu_2(C_2O_4)_3$, and 0.6030 g of $SnO_2@Pd$ were weighed and placed in an agate mortar, sufficient ground to form well mixed powder. The powder was transferred to a corundum crucible, heated at 900° C. for 4 hours in a muffle furnace. Next, the powder was sintered and reduced at 1300° C. in a tube furnace for 3 hours, then cooled to room temperature and ground to obtain stannate fluorescent material of $Ba_{1.992}SnO_4:Eu_{0.008}@SnO_2@Pd_{1\times10^{-5}}$ coating Pd nanoparticles.

Example 2

This example describes a process of preparation $Ca_{1.99}SnO_4:Eu_{0.01}@SnO_2@Au_{1.5\times10^{-4}}$ by using high-temperature solid-phase method.

Preparation of sol containing Au nanoparticles was described below. 0.21 mg of chloroauric acid ($AuCl_3 \cdot HCl \cdot 4H_2O$) was dissolved in 16.8 mL of deionized water. After the chloroauric acid was fully dissolved, 14 mg of sodium citrate and 6 mg of cetyl trimethyl ammonium bromide were weighed and dissolved into the chloroauric acid aqueous solution under magnetic stirring. 1.9 mg of sodium borohydride and 17.6 mg of ascorbic acid were weighed and dissolved into 10 mL of deionized water, respectively, to obtain a 10 mL of sodium borohydride solution with a concentration of $5\times10^{-3}$ mol/L and a 10 mL of ascorbic acid solution with a concentration of $1\times10^{-2}$ mol/L. Under magnetic stirring, 0.08 mL of sodium borohydride solution was firstly added to the chloroauric acid aqueous solution, after stirring for 5 minutes, 3.12 mL of ascorbic acid solution with a concentration of $1\times10^{-2}$ mol/L was then added to the chloroauric acid aqueous solution. After reaction for 30 minutes, 20 mL of sol containing Au nanoparticles was obtained with an Au content of $5\times10^{-4}$ mol/L.

Preparation of $SnO_2@Au$ was described below. 1.5 mL of sol containing Au nanoparticles ($5\times10^{-5}$ mol/L) was weighed and placed in a beaker, and 2 mL of PVP (0.1 g/mL) was added and stirred for 8 hours, so as to obtain surface-treated sol containing Au nanoparticles. The pH value of surface-treated sol containing Au nanoparticles was adjusted to 10.5 using NaOH. After the sol was stirred for 5 min, it was transferred to a water bath at a constant temperature of 60° C. with stirring. 20 mL of $K_2SnO_3$ solution (0.25 mol/L) was fast added, stirred and reacted for 3 hours, centrifugally separated and dried to obtain $SnO_2$ powder coating the metal nanoparticles Au, i.e. $SnO_2$@Au.

Preparation of $Ca_{1.99}SnO_4:Eu_{0.01}$@$SnO_2$@$Au_{1.5\times10^{-4}}$ was described below. 0.7967 g of $CaCO_3$, 0.0070 g of $Eu_2O_3$, and 0.6148 g of $SnO_2$@Au were weighed and placed in an agate mortar, sufficient ground to form well mixed powder. The powder was transferred to a corundum crucible, heated at 800° C. for 2 hours in a muffle furnace. Next, the powder was sintered and reduced at 1200° C. in a tube furnace for 4 hours, then cooled to room temperature and ground to obtain stannate fluorescent material of $Ca_{1.99}SnO_4:Eu_{0.01}$@$SnO_2$@$Au_{1.5\times10^{-4}}$ coating Au nanoparticles.

Figure 2:
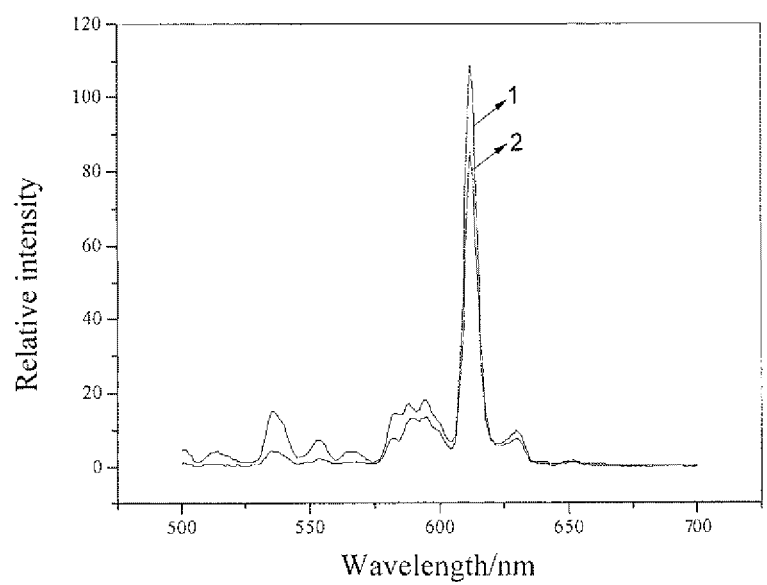
FIG. 2 is a graphical representation of cathodoluminescence spectrum under a voltage of 1.kV of the stannate luminescent material of $Ca_{1.99}SnO_4:Eu_{0.01}@SnO_2@Au_{1.5\times10^{-4}}$ coating metal nanoparticle Au prepared in accordance with Example 2 (designated as #1), and the stannate fluorescent material of $Ca_{1.99}SnO_4: Pr_{0.01}@SnO_2$ without coating metal nanoparticles (designated as #2).

FIG. 2 is a graphical representation of cathodoluminescence spectrum under a voltage of 1.5 kV of the stannate fluorescent material of $Ca_{1.99}SnO_4:Eu_{0.01}$@$SnO_2$@$Au_{1.5\times10^{-4}}$ coating Au nanoparticles prepared in accordance with Example 2, and the fluorescent material of $Ca_{1.99}SnO_4:Eu_{0.01}$@$SnO_2$ without coating metal nanoparticles. It can be seen from FIG. 2 that, at an emission peak of 615 nm, the emission intensity of fluorescent material coating Au nanoparticles is enhanced by 28% comparing to fluorescent material without coating metal nanoparticles. Accordingly, the fluorescent material according to Example 2 has a good stability, good color purity and high luminous efficiency.

Example 3

This example describes a process of preparation of $Sr_{1.98}SnO_4:Eu_{0.02}$@$SnO_2$@$Ag_{2.5\times10^{-4}}$ by using high-temperature solid-phase method.

Preparation of sol containing Ag nanoparticles was described below. 3.4 mg of silver nitrate ($AgNO_3$) was dissolved in 18.4 mL of deionized water. After the silver nitrate was fully dissolved, 42 mg of sodium citrate was weighed and dissolved into the silver nitrate aqueous solution under magnetic stirring. 5.7 mg of sodium borohydride was weighed and dissolved into 10 mL of deionized water to obtain a 10 mL of sodium borohydride solution with a concentration of $1.5\times10^{-2}$ mol/L. Under magnetic stirring, 1.6 mL of sodium borohydride solution ($1.5\times10^{-2}$ mol/L) was added to the silver nitrate aqueous solution. After reaction for 10 minutes, 20 mL of sol containing Ag nanoparticles was obtained with an Ag content of $1\times10^{-3}$ mol/L.

Preparation of $SnO_2$@Ag was described below. 1.2 mL of sot containing Ag nanoparticles ($1\times10^{-3}$ mol/L) was weighed and placed in a beaker, 10 mL of PVP (0.01 g/mL) was added with magnetic stirring for 12 hours, so as to obtain surface-treated sal containing Ag nanoparticles. The pH value of surface-treated sol containing Ag nanoparticles was adjusted to 11 using ammonia. After the sol was stirred for 5 min, it was transferred to a water bath at a constant temperature of 80° C. with stirring. 15 mL of $SnCl_4$ solution (0.32 mol/L) was fast added, stirred and reacted for 3 hours, centrifugally separated and dried to obtain $SnO_2$ powder coating the metal nanoparticles Ag, i.e. $SnO_2$@Ag.

Preparation of $Sr_{1.98}SnO_4:Eu_{0.02}$@$SnO_2$@$Ag_{2.5\times10^{-4}}$ was described below. 1.6292 g of $Sr(CH_3COO)_2$, 0.0263 g of $Eu(CH_3COO)_3$, and 0.6030 g of $SnO_2$@Ag were weighed and placed in an agate mortar, sufficient ground to form well mixed powder. The powder was transferred to a corundum crucible, heated at 1000° C. for 4 hours in a muffle furnace. Next, the powder was sintered and reduced at 1200° C. in a tube furnace for 6 hours, then cooled to room temperature and ground to obtain stannate fluorescent material of $Sr_{1.98}SnO_4:Eu_{0.02}$@$SnO_2$@$Ag_{2.5\times10^{-4}}$ coating Au nanoparticles.

Example 4

This example describes a process of preparation of $Ba_{1.95}SnO_4:Eu_{0.05}$@$SnO_2$@$Pt_{5\times10^{-3}}$ by using high-temperature solid-phase method.

Preparation of sol containing Pt nanoparticles was described below. 25.9 mg of chloroplatinic acid ($H_2PtCl_6 \cdot 6H_2O$) was dissolved in 17 mL of deionized water. After the chloroplatinic acid was fully dissolved, 40.0 mg of sodium citrate and 60.0 mg of sodium lauryl sulfate were weighed and dissolved into the chloroplatinic acid aqueous solution under magnetic stirring. 1.9 mg of sodium borohydride was weighed and dissolved into 10 mL of deionized water to obtain 10 mL of sodium borohydride aqueous solution with a concentration of $5\times10^{-3}$ mol/L. 10 mL of hydrazine hydrate solution ($5\times10^{-2}$ mol/L) was prepared at the same time. Under magnetic stirring, 0.4 mL of sodium borohydride solution was added dropwise to the chloroplatinic acid aqueous solution and stirred for 5 minutes, then 2.6 mL of hydrazine hydrate was added dropwise to the chloroplatinic acid aqueous solution. After reaction for 40 minutes, 10 mL of sal containing Pt nanoparticles was obtained with a Pt content of $1\times10^{-2}$ mol/L.

Preparation of $SnO_2$@Pt was described below. 8 mL of sol containing Pt nanoparticles ($2.5\times10^{-3}$ mol/L) was weighed and placed in a beaker, 4 mL of PVP (0.02 g/mL) was added with magnetic stirring for 18 hours, so as to obtain surface-treated sol containing Pt nanoparticles. The pH value of surface-treated sol containing Pt nanoparticles was adjusted to 12 using NaOH. After the sol was stirred for 5 min, it was transferred to a water bath at a constant temperature of 60° C. with stirring. 10 mL of $Na_2SnO_3$ solution (0.4 mol/L) was fast added, stirred and reacted for 5 hours, centrifugally separated and dried to obtain $SnO_2$ powder coating the metal nanoparticles Pt, i.e. $SnO_2$@Pt.

Preparation of $Ba_{1.95}SnO_4:Eu_{0.05}$@$SnO_2$@$Pt_{5\times10^{-3}}$ was described below. 1.5392 g of $BaCO_3$, 0.0976 g of $Eu_2(CO_3)_3$, and 0.6028 g of $SnO_2$@Pt were weighed and placed in an agate mortar, sufficient ground to form well mixed powder. The powder was transferred to a corundum crucible, heated at 900° C. for 12 hours in a muffle furnace. Next, the powder was sintered and reduced at 1400° C. in a tube furnace for 4 hours, then cooled to room temperature and ground to obtain stannate fluorescent material of $Ba_{1.95}SnO_4:Eu_{0.05}$@$SnO_2$@$Pt_{5\times10^{-3}}$ coating Pt nanoparticles.

Example 5

This example describes a process of preparation of $Ca_{1.998}SnO_4:Eu_{0.002}$@$SnO_2$@$Cu_{1\times10^{-4}}$ by using high-temperature solid-phase method.

Preparation of sol containing Cu nanoparticles was described below. 1.6 mg of copper nitrate was dissolved in 16 mL of ethanol. After the copper nitrate was fully dissolved, 12 mg of PVP was added with stirring. 0.4 mg of sodium borohydride was dissolved into 10 mL of ethanol to obtain a sodium borohydride alcoholic solution with a concentration of $1\times10^{-3}$ mol/L. 5 mL of sodium borohydride alcoholic solution was added dropwise to the copper nitrate solution. After stirring and reacting for 10 minutes, 20 mL of sol containing Cu nanoparticles was obtained with a Cu content of $4\times10^{-4}$ mol/L.

Preparation of SnO$_2$@Cu was described below. 1.5 mL of sol containing Cu nanoparticles (4×10$^{-4}$ mol/L) was weighed and placed in a beaker, 5 ml of PVP (0.03 g/mL) was added with magnetic stirring for 10 hours, so as to obtain surface-treated sol containing Cu nanoparticles. The pH value of surface-treated sol containing Cu nanoparticles was adjusted to 10.5 using NaOH. After the sol was stirred for 15 min, it was transferred to a water bath at a constant temperature of 90° C. with stirring. 30 mL of Na$_2$SnO$_3$ solution (0.2 mol/L) was fast added, stirred and reacted for 1 hour, centrifugally separated and dried to obtain SnO$_2$ powder coating the metal nanoparticles Cu, i.e. SnO$_2$@Cu.

Preparation of Ca$_{1.998}$SnO$_4$:Eu$_{0.002}$@SnO$_2$@Cu$_{1\times10^{-4}}$ was described below. 1.3107 g of Ca(NO$_3$)$_2$, 0.0027 g of Eu(NO$_3$)$_3$, and 0.6028 g of SnO$_2$@Cu were weighed and placed in an agate mortar, sufficient ground to form well mixed powder. The powder was transferred to a corundum crucible, heated at 800° C. for 5 hours in a muffle furnace. Next, the powder was sintered and reduced at 1300° C. in a tube furnace for 0.5 hour, then cooled to room temperature and ground to obtain stannate fluorescent material of Ca$_{1.998}$SnO$_3$:Eu$_{0.002}$@SnO$_2$@Cu$_{1\times10^{-4}}$ coating Cu nanoparticles.

Example 6

This example describes a process of preparation of Sr$_{1.88}$SnO$_4$:Eu$_{0.12}$@SnO$_2$@(Ag$_{0.5}$/Au$_{0.5}$)$_{1.25\times10^{-3}}$ by using high-temperature solid-phase method.

Preparation of sol containing Ag$_{0.5}$/Au$_{0.5}$ nanoparticles was described below. 6.2 mg of chloroauric acid (AuCl$_3$·HCl·4H$_2$O) and 2.5 mg of AgNO$_3$ were dissolved in 28 mL of deionized water. After they were fully dissolved, 22 mg of sodium citrate and 20 mg of PVP were weighed and added to the mixture solution under magnetic stirring. 5.7 mg of sodium borohydride was dissolved into 10 mL of deionized water to obtain a sodium borohydride aqueous solution with a concentration of 1.5×10$^{-2}$ mol/L. 2 mL of sodium borohydride aqueous solution (1.5×10$^{-2}$ mol/L) was added to the mixture solution. After stirring and reacting for 20 minutes, 30 mL of sol containing Ag$_{0.5}$/Au$_{0.5}$ nanoparticles was obtained with a sum metal (Ag+Au) content of 1×10$^{-3}$ mol/L.

Preparation of SnO$_2$@(Ag$_{0.5}$/Au$_{0.5}$) was described below. 5 mL of sol containing Ag$_{0.5}$/Au$_{0.5}$ nanoparticles (1×10$^{-3}$ mol/L) was weighed and placed in a beaker, 10 mL of PVP (0.1 g/mL) was added with magnetic stirring for 12 hours, so as to obtain surface-treated sol containing Ag$_{0.5}$/Au$_{0.5}$ nanoparticles. The pH value of surface-treated sol containing Ag$_{0.5}$/Au$_{0.5}$ nanoparticles was adjusted to 11 using NaOH. After the sol was stirred for 15 min, it was transferred to a water bath at a constant temperature of 70° C. with stirring. 30 mL of K$_2$SnO$_3$ solution (0.2 mol/L) was fast added, stirred and reacted for 1 hour, centrifugally separated and dried to obtain SnO$_2$ powder coating the metal nanoparticles Ag$_{0.5}$/Au$_{0.5}$, i.e. SnO$_2$@(Ag$_{0.5}$/Au$_{0.5}$).

Preparation of Sr$_{1.88}$SnO$_4$:Eu$_{0.12}$@SnO$_2$@(Ag$_{0.5}$/Au$_{0.5}$)$_{1.25\times10^{-3}}$ was described below. 0.7792 g of SrO, 0.0844 g of Eu$_2$O$_3$, and 0.6028 g of SnO$_2$@(Ag$_{0.5}$/Au$_{0.5}$) were weighed and placed in an agate mortar, sufficient ground to form well mixed powder. The powder was transferred to a corundum crucible, heated at 1000° C. for 3 hours in a muffle furnace. Next, the powder was sintered and reduced at 1250° C. in a tube furnace for 5 hour, then cooled to room temperature and ground to obtain stannate fluorescent material of Sr$_{1.88}$SnO$_4$:Eu$_{0.12}$@SnO$_2$@(Ag$_{0.5}$/Au$_{0.5}$)$_{1.25\times10^{-3}}$ coating Ag$_{0.5}$/Au$_{0.5}$ nanoparticles.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A stannate fluorescent material, having a formula:

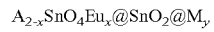

$A_{2-x}SnO_4Eu_x@SnO_2@M_y,$ wherein A is selected from the group consisting of Ca, Sr, and Ba;
M is at least one metal nanoparticles selected from the group consisting of Ag, Au, Pt, Pd, and Cu;
0<x≤0.05;
y is a mole ratio of M to Sn in formula SnO$_2$@M$_y$, and 0<y≤1×10-2;
@ represents coating, in the stannate fluorescent material, M serves as a core,
SnO$_2$ serves as an intermediate layer shell, and
A$_{2-x}$SnO$_4$:Eu$_x$ serves as an outer layer shell.

2. A method of preparing a stannate fluorescent material, comprising the following steps:
preparing a sol containing M, wherein M is at least one metal nanoparticles selected from the group consisting of Ag, Au, Pt, Pd, and Cu;
adjusting the pH value of the sol containing M to 10 to 12, heating and stirring the sol containing M at a temperature of 60° C. to 90° C., adding sodium stannate, potassium stannate, or tin tetrachloride according to a mole ratio y of M to Sn in formula SnO$_2$@M$_y$, stirring and reacting, separating and drying to obtain SnO$_2$@M powder, wherein 0<y≤1×10$^{-2}$;
mixing an A compound, an Eu compound, and the SnO$_2$@M powder according to a stoichiometric ratio of formula of A$_{2-x}$SnO$_4$:Eu@SnO$_2$@M$_y$ to obtain a mixture;
heating the mixture, cooling and grinding the mixture to obtain the stannate fluorescent material having the formula A$_{2-x}$SnO$_4$:Eu$_x$@SnO$_2$@M$_y$;
wherein A is selected from the group consisting of Ca, Sr, and Ba; 0<x≤0.05; in the stannate fluorescent material, M serves as a core, SnO$_2$ serves as an intermediate layer shell, and A$_{2-x}$SnO$_4$:Eu$_x$ serves as an outer layer shell.

3. The method according to claim 2, wherein the step of preparing the sol containing M comprises:
mixing a salt solution of at least one metal selected from the group consisting of Ag, Au, Pt, Pd, and Cu, with an additive and a reductant, and reacting for 10 to 45 minutes to obtain the sol containing M;
wherein the additive is at least one selected from the group consisting of polyvinylpyrrolidone, sodium citrate, cetyl trimethyl ammonium bromide, sodium lauryl sulfate, and sodium dodecyl sulfate.

4. The method according to claim 3, wherein the concentration of the salt solution of at least one metal selected from the group consisting of Ag, Au, Pt, Pd, and Cu ranges from 1×10$^{-3}$ mol/L to 5×10$^{-2}$ mol/L;
the concentration of the additive in the sol containing M ranges from 1×10$^{-4}$ g/mL to 5×10$^{-2}$ g/mL;
the reductant is at least one selected from the group consisting of hydrazine hydrate, ascorbic acid, sodium citrate, and sodium borohydride;

a mole ratio between the reductant and metal ion of the salt solution of at least one metal selected from the group consisting of Ag, Au, Pt, Pd, and Cu ranges from 3.6:1 to 18:1.

5. The method according to claim 2, further comprising the step of surface-treating the sol containing M, wherein surface-treating the sol containing M comprises:
adding the sol containing M into an aqueous solution of polyvinyl pyrrolidone and stirring for 12 to 24 hours.

6. The method according to claim 5, wherein the concentration of the aqueous solution of polyvinyl pyrrolidone ranges from 0.005 g/mL to 0.01 g/mL.

7. The method according to claim 2, wherein the step of adjusting the pH value of the sol containing M to 10 to 12 comprises adjusting the pH value using sodium hydroxide or ammonia.

8. The method according to claim 2, wherein the stirring and reacting time takes 1 to 5 hours.

9. The method according to claim 2, wherein the step of heating the mixture comprises:
precalcining the mixture at a temperature of 800° C. to 1200° C. for 2 to 12 hours, and then calcining the mixture at 1000° C. to 1400° C. for at 0.5 to 6 hours.

10. The method according to claim 2, wherein the A compound is oxides, carbonates, acetates or oxalates corresponding to A; the Eu compound is oxides, carbonates, acetates or oxalates corresponding to Eu.

* * * * *